US010788926B2

(12) United States Patent
Li

(10) Patent No.: US 10,788,926 B2
(45) Date of Patent: Sep. 29, 2020

(54) TOUCH CONTROL PANEL AND MANUFACTURING METHOD THEREOF

(71) Applicant: BOE TECHNOLOGY GROUP CO., LTD., Beijing (CN)

(72) Inventor: Wang Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/250,975

(22) Filed: Jan. 17, 2019

(65) Prior Publication Data

US 2019/0302955 A1    Oct. 3, 2019

(30) Foreign Application Priority Data

Mar. 29, 2018   (CN) ........................ 2018 1 0270343

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01); *G06F 2203/04103* (2013.01); *G06F 2203/04104* (2013.01)

(58) Field of Classification Search
CPC . G06F 2203/04103; G06F 2203/04104; G06F 2203/04111; G06F 3/0412;

(Continued)

(56) References Cited

U.S. PATENT DOCUMENTS

| 2009/0315858 | A1* | 12/2009 | Sato ...................... G06F 3/0416 345/174 |
| 2010/0007616 | A1* | 1/2010 | Jang ...................... G06F 3/0412 345/173 |

(Continued)

FOREIGN PATENT DOCUMENTS

| CN | 104571759 A | 4/2015 |
| CN | 105378621 A | 3/2016 |

(Continued)

OTHER PUBLICATIONS

Chinese Office Action dated Apr. 27, 2020, from application No. 201810270343.8.

*Primary Examiner* — Ram A Mistry
(74) *Attorney, Agent, or Firm* — Foley & Lardner LLP

(57) ABSTRACT

The present disclosure provides a touch control panel including a first insulating layer, a touch control pattern layer, a second insulating layer and a pattern matching layer. The touch control pattern layer is provided on the first insulating layer, and the touch control pattern layer includes a plurality of driving electrodes laterally arranged, a plurality of detection electrodes longitudinally arranged and a plurality of spacer regions provided therebetween. A second insulating layer is provided on the touch control pattern layer and the second insulating layer forms recessed regions at a position of the spacer regions. A pattern matching layer is provided on the second insulating layer. A material and thickness of the pattern matching layer are the same as those of the touch control pattern layer. An orthographic projection of the pattern matching layer on the second insulating layer coincides with the recessed regions.

12 Claims, 2 Drawing Sheets

(58) Field of Classification Search
CPC ...... G06F 3/0416; G06F 3/044; G06F 3/0443; G06F 3/0446
See application file for complete search history.

(56) References Cited

U.S. PATENT DOCUMENTS

| | | | | |
|---|---|---|---|---|
| 2012/0147467 | A1* | 6/2012 | Park | G06F 3/0412 359/488.01 |
| 2016/0170549 | A1* | 6/2016 | Namkung | G06F 3/044 345/173 |
| 2017/0351363 | A1 | 12/2017 | Lee et al. | |

FOREIGN PATENT DOCUMENTS

| | | |
|---|---|---|
| CN | 105700731 A | 6/2016 |
| CN | 107844209 A | 3/2018 |

* cited by examiner

TOUCH CONTROL PANEL AND MANUFACTURING METHOD THEREOF

CROSS REFERENCE

This application is based upon and claims priority to Chinese Patent Application No. 201810270343.8, filed on Mar. 29, 2018, the entire contents thereof are incorporated herein by reference.

TECHNICAL FIELD

The present disclosure relates to the field of display technologies, and in particular, to a touch control panel, a manufacturing method of the touch control panel and a touch control display device provided with the touch control panel.

BACKGROUND

With the development of active matrix organic light-emitting diode technology, user's requirements for screen resolution are getting higher and higher. Therefore, more stringent requirements for the optical display effects of the screen are proposed.

Most of the existing touch control screen displays are single-layer mutual-capacitive touch control screens, in which driving electrodes and the detecting electrodes are arranged in one layer to form a single-layer touch control design. Although one process is omitted and thus the cost is saved, but, the same layer layout of the driving electrodes and the detecting electrodes causes the touch control film must be patterned, which directly causes the touch control pattern can be observed by human eyes during the screen display period, resulting in degraded screen display effects and poor user experience.

Therefore, there is a need on a touch control panel, a manufacturing method of the touch control panel and a touch control display device provided with the touch panel.

SUMMARY

According to the first aspect of the present disclosure, it provides a touch control panel. The touch control panel includes a first insulating layer, a touch control pattern layer provided on the first insulating layer, a second insulating layer, provided on the touch control pattern layer, and a pattern matching layer, provided on the second insulating layer. The touch control pattern layer includes a plurality of driving electrodes laterally arranged, a plurality of detection electrodes longitudinally arranged and a plurality of spacer regions located between the plurality of driving electrodes and the plurality of detecting electrodes. The detecting electrodes along the same longitudinal direction are connected as integration, and the driving electrodes are located between two adjacent detecting electrodes. The second insulating layer forms recessed regions at corresponding position of the spacer regions. A material of the pattern matching layer is the same as a material of the touch control pattern layer. A thickness of the pattern matching layer is consistent with a thickness of the touch control pattern layer. An orthographic projection of the pattern matching layer on the second insulating layer coincides with the recessed regions.

According to the second aspect of the present disclosure, it provides a touch control panel, and the touch control panel includes the aforesaid touch control panel.

According to the third aspect of the present disclosure, it provides a method for making a touch control panel. The method includes forming a touch control pattern layer on the first insulating layer. The touch control pattern layer includes a plurality of driving electrodes laterally arranged, a plurality of detection electrodes longitudinally arranged and a plurality of spacer regions located between the plurality of driving electrodes and the plurality of detecting electrodes. The detecting electrodes along the same longitudinal direction are connected as integration, and the driving electrodes are located between two adjacent detecting electrodes. The method includes forming a second insulating layer on the touch control pattern layer. The second insulating layer forms recessed regions at corresponding positions of the spacer regions. The method includes forming a pattern matching layer on the second insulating layer. A material of the pattern matching layer is the same as a material of the touch control pattern layer. A thickness of the pattern matching layer is consistent with a thickness of the touch control pattern layer. An orthographic projection of the pattern matching layer on the second insulating layer coincides with the recessed regions.

BRIEF DESCRIPTION OF THE DRAWINGS

Arrangements according to the present disclosure have been shown in the accompanying drawings, which are incorporated into the specification and form part of the specification and serves to explain the principles of the present disclosure together with the specification. It is apparent that, the drawings as described herein below are only some of the arrangements of the present disclosure, and other modification and equivalents can be readily realized from those drawings by those skilled in the art.

DETAILED DESCRIPTION

The exemplary arrangements of the present disclosure will now be described more fully with reference to accompanying drawings. However, the exemplary arrangements of the present disclosure may be embodied in a variety of forms, and should not be construed as being limited to the examples set forth herein. Contrarily, these arrangements are provided so that the present disclosure will be more complete and comprehensive and the concepts of the exemplary arrangements are fully conveyed to those skilled in the art. The described features, structures, or characteristics may be combined in any suitable manner in one or more arrangements of the present disclosure.

Figure 1:
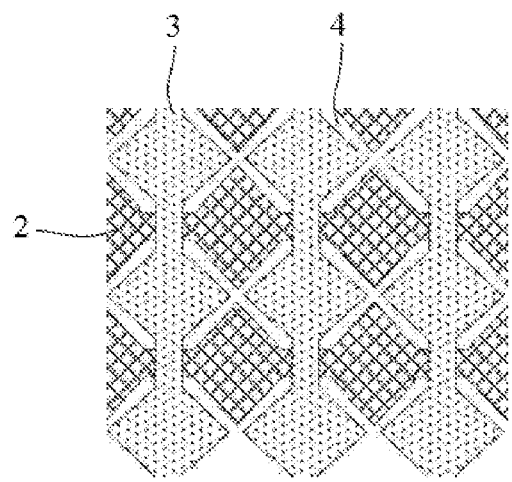
FIG. 1 schematically shows a structural diagram of the touch control pattern layer of single-layer multi-point mutual capacitive touch control screen.

Referring to the structural diagram of the touch control pattern layer of single-layer multi-point mutual capacitive touch control screen shown in FIG. 1, the touch control pattern layer may include a plurality of touch control units, and each of the touch control units includes a driving electrode and a detecting electrode. The driving electrodes 2 are laterally arranged, a plurality of detection electrodes 3 are longitudinally arranged, and a plurality of spacer regions 4 which are provided between adjacent driving electrodes and detecting electrodes. The detecting electrodes of adjacent touch control units may be connected by via holes, or, alternatively, may be connected by bridges, in which a plurality of detecting electrodes 3 arranged along the same longitudinal direction are bridged to each other.

Figure 2:
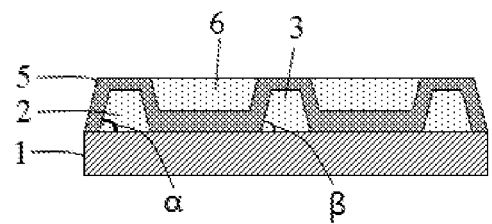
FIG. 2 schematically shows a cross section diagram of the touch control panel of the present disclosure.

In the present exemplary arrangement, a touch control panel is provided, for which reference may be made to the schematic cross section diagram of the touch control panel as shown in FIG. 2. The touch control panel may include a first insulating layer 1, a touch control pattern layer, a second insulating layer 5 and a pattern matching layer 6. The pattern matching layer is provided on the insulating layer, and the touch control pattern layer may include a plurality of touch control units. Each of the touch control units includes a driving electrode 2 and a detecting electrode 3. The spacer regions 4 are provided between adjacent driving electrodes 2 and detecting electrodes 3. The second insulating layer 5 is provided on the touch control pattern layer, and the second insulating layer 5 is formed with recessed regions at the position of the spacer regions 4. A pattern matching layer 6 is provided on the second insulating layer 5. The material of the pattern matching layer 6 is the same as the material of the touch control pattern layer. The thickness of the pattern matching layer 6 is consistent with the thickness of the touch control pattern layer, and an orthographic projection of the pattern matching layer 6 on the second insulating layer coincides with an orthographic projection of the recessed regions.

According to the touch panel of the present exemplary arrangement, on one hand, whether the light passes through the touch control pattern layer and the second insulating layer 5 or the light passes through the second insulating layer 5 and the pattern matching layer 6, the thickness and the material that the light passes through are the same, so the light emitted from the entire panel is relatively uniform. Therefore, the touch control pattern cannot be observed by human eyes during the display period. On the other hand, due to the pattern matching layer 6 provided on the second insulating layer 5, a relatively flat top surface is formed, which may facilitate providing the remaining layers.

Hereinafter, the touch control panel in the present exemplary arrangement will be described with more details.

In the present exemplary arrangement, the material of the first insulating layer 1 may be glass or a transparent resin material.

The touch control pattern layer is provided on the first insulating layer 1. The touch control pattern layer may include a plurality of touch control units, and each of the touch control units includes a driving electrode 2 and a detecting electrode 3. The detecting electrodes of adjacent touch control units may be connected by via holes, and the spacer regions 4 are provide between adjacent driving electrodes and detecting electrodes. The detecting electrodes along the same longitudinal direction are connected with each other, and the driving electrodes are located between two adjacent detecting electrodes. As an example, the cross-sectional shape of the detecting electrodes 3 is approximately a rhombic shape, and the two adjacent detecting electrodes 3 are connected together. The cross-sectional shape of the driving electrodes 2 is approximately a rhombic shape, and the driving channel 2 is provided in a substantially rhombic shaped space among four adjacent detecting electrodes 3.

In the present exemplary arrangement, the coating is performed on one side of the first insulating layer 1, and then etching process is performed on the film layer according to the requirement of the touch control pattern layer to form a touch control patter layer. The thickness of the touch control pattern layer is approximately 1500 A.

The surface of the touch control pattern layer that is in contact with the first insulating layer 1 is referred to herein as a bottom surface, and the surface of the touch control pattern layer that is away from the first insulating layer 1 is referred to as a top surface, and the surfaces between the bottom surface and the top surface are side surfaces. When the film layer is etched to form the touch control pattern layer, the side surfaces of the touch control pattern layer are etched, so that the side surfaces of the formed driving electrodes 2 forms a first angle $\alpha$ with the first insulating layer 1, and the first angle $\alpha$ is an acute angle. The side surfaces of the formed detecting channel 3 forms a second angle $\beta$ with the first insulating layer 1, and the second angle $\beta$ is an acute angle. The area of the top surface of the driving electrodes 2 is smaller than the area of the bottom surface, and the area of the top surface of the detecting electrodes 3 is also smaller than the area of the bottom surface.

In one arrangement, the first angle $\alpha$ may be less than or equal to 65°, and the second angle $\beta$ may be less than or equal to 65°. The angle value of the first angle $\alpha$ and the second angle $\beta$ is relatively small, which facilitates the climbing slope process of the second insulating layer 5, and the second insulating layer 5 is not easily broken. Of course, those skilled in the art can understand that as an alternative, the first angle $\alpha$ and the second angle $\beta$ may be set to 70° or 80°, as long as it is less than 90°. The angle value of the first angle $\alpha$ and the second angle $\beta$ may be the same, which facilitates the control of the etching time and the flow. Of course, the angle value of the first angle $\alpha$ and the second angle $\beta$ may be different.

The second insulating layer 5 is provided on the touch control pattern layer, and the second insulating layer 5 includes recessed regions that are formed at positions of the spacer regions.

In the present exemplary arrangement, the second insulating layer 5 covers the entire touch control pattern layer, that is, covers not only the driving channel 2 and the detecting channel 3 but also the spacer regions 4 between the driving channel 2 and the detecting channel 3. Since no other layer is formed at the positions of the spacer regions 4, the second insulating layer 5 directly covers the first insulating layer 1, and therefore, recessed regions are formed at the positions of the spacer regions 4. The second insulating layer 5 may be an inorganic insulating film made of, such as, silicon nitride, silicon oxide and so on; or, alternatively, the second insulating layer 5 may be an organic insulating film made of, such as, various resin materials.

Moreover, the second insulating layer 5 may satisfy the following requirements: a first side surface away from the touch control pattern layer of the second insulating layer 5 located on the side surface of the driving electrodes 2 with the first insulating layer 1 form an angle which is the same as the first angle $\alpha$, and a second side surface away from the touch control pattern layer of the second insulating layer 5 located on the side surface of the detecting electrodes 3 with the first insulating layer form an angle which is the same as the second angle $\beta$. That is, the thickness of the second insulating layer 5 located on the side surface of the driving electrodes 2 may be kept uniform, and the thickness of the second insulating layer 5 located on the side surface of the detecting electrodes 3 may be kept uniform. That is, the two side surfaces of located on the side surface of the driving electrodes 2 are kept parallel, and the two side surfaces of located on the side surface of the detecting electrodes 3 are kept parallel. It is possible to cause the light passing through the second insulating layer 5 with the same incident angle maintain the same angle of refraction, thus further improving the uniformity of the exiting light path.

If the second insulting layer 5 does not satisfy the above requirements, fine adjustment may be performed by an etching method, that is, to etch the portion where it is too thick so that the second insulating layer 5 satisfies the above requirements.

The pattern matching layer 6 is provided on the second insulating layer 5, the material of the pattern matching layer 6 is the same as the material of the touch control pattern layer, and the thickness of the pattern matching layer 6 is consistent with the thickness of the touch control pattern layer, and an orthographic projection of the pattern matching layer 6 on the second insulating layer coincides with the recessed regions.

In the present exemplary arrangement, a matching layer may be formed on the second insulating layer 5 by evaporation or sputtering methods. Photolithography is performed on the matching layer to form pattern matching layer 6. Alternatively, the pattern matching layer 6 may be directly formed on a substrate, and then transferred on the second insulating layer 5 by a transfer process. The pattern matching layer 6 is not connected with electrically signal.

The orthographic projection of the pattern matching layer 6 on the second insulating layer coincides with the recessed regions, and the pattern matching layer 6 has the same inclination angle as the recessed regions of the second insulating layer 5. The pattern matching layer 6 and the recessed regions of the second insulating layer 5 are completely attached to fill the recessed regions. The side surface of the driving channel 2 is inclined, and the side surface of the detecting channel 3 is also inclined, and the side surface of the recessed regions of the second insulating layer 5 is inclined, so that the portion where the pattern matching layer 6 is in contact with the second insulating layer 5 is formed in an inclined shape. The light passing through the spacer regions 4 may pass through a portion of the pattern matching layer 6 and/or a part of the touch control pattern layer. So the occasion that the light only passes through the second insulating layer 5 is prevented from occurring. Thus, undesired light refraction, reflection, unevenness, and etc. caused by the medium can be avoided. Even if there are still some unevenness, the display effects change gradually, and the difference is very small, which is difficult for the human eyes to observe, thus further increasing the uniformity of the exiting light path, and avoiding the touch pattern being observed by the human eyes.

The material of the pattern matching layer 6 is the same as the material of the touch control pattern layer, so that the angle of refraction of the light with the same incident angle passing through the pattern matching layer 6 and the touch control pattern layer is the same. The thickness of the pattern matching layer 6 is the same as that of the touch pattern layer, so that the offset distance of the light with the same incident angle passing through the pattern matching layer 6 and the touch control pattern layer is the same.

The touch control panel may further include a plurality of connection holes 7 and a plurality of connection wires 8. The plurality of connection holes are provided on the driving electrodes 2. The plurality of connection wires 8 penetrate the two of the connection holes 7 to connect adjacent driving electrodes 2.

Figure 3:
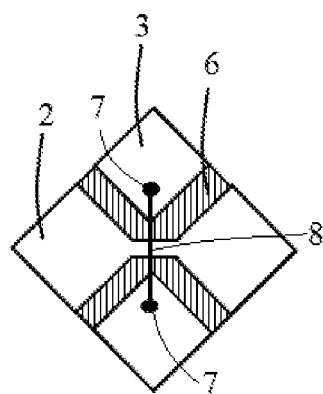
FIG. 3 schematically shows a top view diagram of the touch control panel of the present disclosure.

Now reference is made to the top view diagram of the touch control panel of the present disclosure as shown in FIG. 3. In the present exemplary arrangement, since the plurality of driving electrodes 2 are not connected to each other, two connection holes 7 are provided in each of the driving electrodes 2. One end of the connection wires 8 penetrates one of the connection holes 7 on one of the driving electrodes 2 among the two adjacent driving electrodes 2, and the other end of the connection wires 8 penetrates another of the connection holes 7 on another of the driving electrodes 2 among the two adjacent driving electrodes 2, so that the connection wires 8 connect the two adjacent driving electrodes 2.

In an arrangement, the present disclosure further provides a touch control display device, which may include the above touch control panel. The structure of the touch panel has been described in detail above and will not be described herein.

Figure 4:
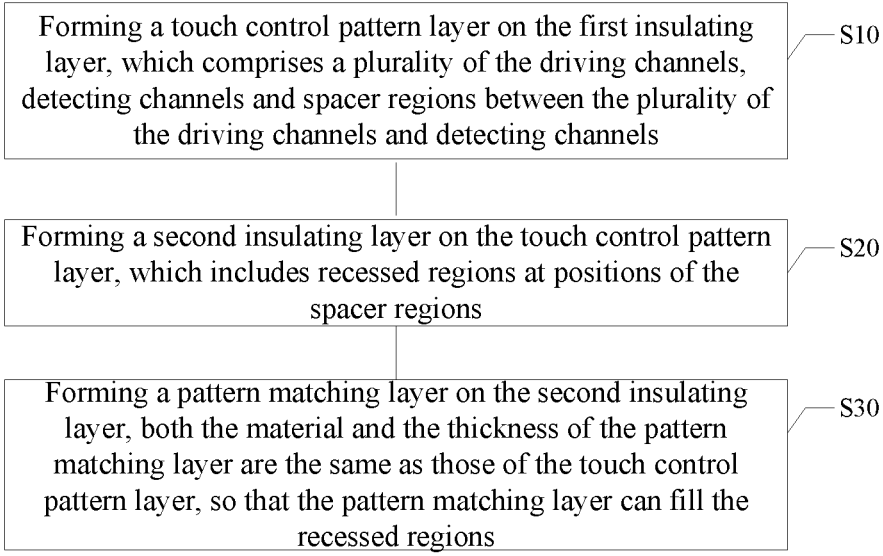
FIG. 4 schematically shows a flow chart of the manufacturing method of the touch control panel.

In an arrangement, the present example arrangement further provides a manufacturing method of the touch control panel for manufacturing the above touch control panel. Referring to the flow chart of the manufacturing method of the touch control panel as shown in FIG. 4, the manufacturing method of the touch control panel may include the following blocks.

In block S10, the touch control pattern layer is formed on the first insulating layer 1. The touch control pattern layer may include a plurality of touch control units, and each of the touch control units includes a driving electrode 2 and a detecting electrode 3. The detecting electrodes of adjacent touch control units may be connected by via holes, and the spacer regions 4 are provide between adjacent driving electrodes and detecting electrodes.

In block S20, the second insulating layer 5 is formed on the touch control pattern layer, the second insulating layer 5 includes recessed regions formed at positions of the spacer regions.

In block S30, the pattern matching layer 6 is formed on the second insulating layer 5. A material of the pattern matching layer 6 is the same as a material of the touch control pattern layer. A thickness of the pattern matching layer 6 is the same as a thickness of the touch control pattern layer. An orthographic projection of the pattern matching layer 6 on the second insulating layer coincides with an orthographic projection of the recessed regions.

In the present exemplary arrangement, after forming the touch pattern layer, the manufacturing method may further include: etching the side walls of the driving electrodes 2 and the side walls of the detecting electrodes 3, so that the side surfaces of the formed driving electrodes 2 form a first angle α with the first insulating layer 1. The first angle α is an acute angle. The side surfaces of the formed detecting channel 3 form a second angle β with the first insulating layer 1, and the second angle β is an acute angle.

In the present exemplary arrangement, the first angle α may be less than or equal to 65°, and the second angle β may be less than or equal to 65°.

In the present exemplary arrangement, after forming the second insulating layer 5, the manufacturing method may further include: etching the second insulating layer 5, so that a first side surface away from the touch control pattern layer of the second insulating layer 5 located on the side surface of the driving electrodes 2 with the first insulating layer 1 forms an angle which is the same as the first angle α, and a second side surface away from the touch control pattern layer of the second insulating layer 5 located on the side surface of the detecting electrodes 3 with the first insulating layer forms an angle which is the same as the second angle β.

In the present exemplary arrangement, forming the pattern matching layer 6 on the second insulating layer 5 may include: forming the matching layer on the second insulating layer 5 by evaporation or sputtering method, and performing photolithography on the matching layer to form the pattern matching layer 6.

In the present exemplary arrangement, forming the pattern matching layer 6 on the second insulating layer 5 may include: forming the pattern matching layer 6 on the substrate, and transferring the pattern matching layer 6 on the second insulating layer 5 by the transfer process.

In the present exemplary arrangement, in addition to connecting adjacent driving electrodes through via holes, the manufacturing method may further include: forming the connection holes on the driving electrodes, and connecting two adjacent driving electrodes by connection wires.

In addition, although the various blocks of the method of the present disclosure are described in a particular order in the accompany figures, this is not required or implied that the blocks must be performed in the specific order, or all the blocks shown must be performed to achieve the desired results. Additionally or alternatively, certain blocks may be omitted, and multiple blocks may be combined into one block to execute, and/or one block is decomposed into multiple blocks to execute.

The details of each block in the manufacturing method of the touch control panel have been described in detail in the corresponding touch control panel, and thus will not be described herein.

Although the relative terms such as "top" and "bottom" are used in this specification to describe the relative relationship of one component of the icon to another component. However, these terms are used in this specification for convenience only, for example, the direction of the example has been described according to the accompany figures. It will be understood that if the icon's device is flipped upside down, the component described in the "top" will become the "bottom" component. When a structure is "on" another structure, it is possible that a structure is integrally formed on another structure, or that a structure is "directly" disposed on another structure, or that a structure is "indirectly" disposed on other structures through another structure.

In the present specification, the terms "a", "an", "the" are used to indicate the existence of one or more elements/components, etc.; the terms "comprising", "including", and "providing" indicate the meaning of open comprising, and there may be additional elements/components/etc. in addition to the listed elements/components/etc.; the terms "first", "second" and "third" are used as a marker only, not a limit on the number of objects.

Other arrangements of the present disclosure will be readily contemplated by those skilled in the art after considering the specification and practicing the present disclosure herein. The present application is intended to cover any variations, uses, or adaptations of the present disclosure, which are in accordance with the general principles of the present disclosure and comprise common general knowledge or conventional technical means in the art that are not disclosed in the present disclosure. The specification and arrangements are only regarded as illustrative and the true scope and essence of the present disclosure are indicated by the appended claims.

What is claimed is:

1. A touch control panel, comprising:
   a first insulating layer;
   a touch control pattern layer, provided on the first insulating layer, the touch control pattern layer comprising a plurality of touch control units,
   wherein each of the plurality of touch control units comprises a driving electrode and a detecting electrode;
   the driving electrodes of the plurality of touch control units extend along a first direction;
   the detecting electrodes of the plurality of touch control units extend along a second direction, and
   the first direction is perpendicular to the second direction,
   wherein the respective detecting electrodes of adjacent ones of the plurality of touch control units are connected by via holes,
   and wherein spacer regions are provided between adjacent driving electrodes and detecting electrodes;
   a second insulating layer, provided on the touch control pattern layer, wherein the second insulating layer includes recessed regions at corresponding positions of the spacer regions; and
   a pattern matching layer, provided on the second insulating layer, wherein a thickness of the pattern matching layer is consistent with a thickness of the touch control pattern layer, and an orthographic projection of the pattern matching layer on the second insulating layer coincides with an orthographic projection of the recessed regions,
   wherein a first side wall of the driving electrodes extending along the first direction and forms a first angle with the first insulating layer, the first angle being a first acute angle; and a second side wall of the detecting electrodes extending along the second direction and forms a second angle with the first insulating layer, the second angle being a second acute angle, and
   a first side surface of the second insulating layer located away from the touch control pattern layer and located on the first side wall of the driving electrodes and forms the first angle with the first insulating layer, and a second side surface of the second insulating layer located away from the touch control pattern layer and located on the second side wall of the detecting electrodes and forms the second angle with the first insulating layer, the pattern matching layer and the recessed regions of the second insulating layer are completely attached to fill the recessed regions.

2. The touch control panel according to claim 1, wherein the pattern matching layer is not connected with an electrical signal.

3. The touch control panel according to claim 1, wherein a material of the pattern matching layer is identical to a material of the touch control pattern layer.

4. The touch control panel according to claim 1, wherein, the first angle is less than or equal to 65°, and the second angle is less than or equal to 65°.

5. A touch control display device, comprising:
   the touch control panel according to claim 1.

6. A manufacturing method of a touch control panel, comprising:
   forming a touch control pattern layer on a first insulating layer, the touch control pattern layer comprising a plurality of touch control units, each of the touch control units comprising a driving electrode and a detecting electrode, the driving electrodes of the plurality of touch control units being laterally arranged, and the detecting electrodes of the plurality of touch control units being longitudinally arranged, wherein the respective detecting electrodes of adjacent one of the plurality of touch control units are connected by via holes, and wherein spacer regions are provided between adjacent driving electrodes and detecting electrodes;

forming a second insulating layer on the touch control pattern layer, wherein the second insulating layer includes recessed regions at corresponding positions of the spacer regions;

forming a pattern matching layer on the second insulating layer, wherein a thickness of the pattern matching layer is consistent with a thickness of the touch control pattern layer, and an orthographic projection of the pattern matching layer on the second insulating layer coincides with an orthographic projection of the recessed regions, wherein after forming of the touch control pattern layer, the manufacturing method further comprises:

etching a first side wall of the driving electrodes and a second side wall of the detecting electrodes, a first angle is formed between the first side wall extending longitudinally and the first insulating layer, the first angle being a first acute angle and a second angle is formed between the second side wall extending laterally and the first insulating layer, the second angle being a second acute angle, wherein a first side surface of the second insulating layer located away from the touch control pattern layer and located on the first side wall of the driving electrodes and forms the first angle with the first insulating layer, and a second side surface of the second insulating layer located away from the touch control pattern layer and located on the second side wall of the detecting electrodes and forms the second angle with the first insulating layer, the pattern matching layer and the recessed regions of the second insulating layer are completely attached to fill the recessed regions.

7. The manufacturing method of a touch control panel according to claim 6, wherein no electrical signal connection is coupled to the pattern matching layer.

8. The manufacturing method of a touch control panel according to claim 6, wherein a material of the pattern matching layer is the same as a material of the touch control pattern layer.

9. The manufacturing method of a touch control panel according to claim 6, wherein the first angle is less than or equal to 65°, and the second angle is less than or equal to 65°.

10. The manufacturing method of a touch control panel according to claim 6, wherein forming the pattern matching layer on the second insulating layer comprises:

forming a matching layer on the second insulating layer by an evaporation process or a sputtering process;

performing a photolithography process on the matching layer to form the pattern matching layer.

11. The manufacturing method of a touch control panel according to claim 6, wherein forming the pattern matching layer on the second insulating layer comprises:

transferring the pattern matching layer on the second insulating layer by a transfer process.

12. The manufacturing method of a touch control panel according to claim 6, further comprising:

forming via holes to connect adjacent driving electrodes.

* * * * *